United States Patent
Reuter et al.

(10) Patent No.: US 9,090,257 B2
(45) Date of Patent: Jul. 28, 2015

(54) METHOD IN A MOTOR VEHICLE HAVING AT LEAST ONE DRIVE ENGINE

(71) Applicant: Bayerische Motoren Werke Aktiengesellschaft, Munich (DE)

(72) Inventors: Frank Reuter, Munich (DE); Ulrich Hetzenecker, Herrsching (DE); Clemente de Castro Bonfim, Munich (DE); Thomas Oberpriller, Ast (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 116 days.

(21) Appl. No.: 13/909,500

(22) Filed: Jun. 4, 2013

(65) Prior Publication Data
US 2013/0325273 A1    Dec. 5, 2013

(30) Foreign Application Priority Data
Jun. 5, 2012 (DE) .................... 10 2012 209 452

(51) Int. Cl.
| | |
|---|---|
| G06F 7/00 | (2006.01) |
| B60W 30/00 | (2006.01) |
| B60W 10/04 | (2006.01) |
| B60W 10/10 | (2012.01) |
| B60W 50/10 | (2012.01) |
| B60W 10/02 | (2006.01) |
| B60W 10/06 | (2006.01) |
| F16H 63/50 | (2006.01) |
| B60W 30/18 | (2012.01) |

(Continued)

(52) U.S. Cl.
CPC ............ *B60W 30/00* (2013.01); *B60W 10/02* (2013.01); *B60W 10/04* (2013.01); *B60W 10/06* (2013.01); *B60W 10/10* (2013.01); *B60W 30/18054* (2013.01); *B60W 50/10* (2013.01); *F16H 63/50* (2013.01); *B60W 30/192* (2013.01); *B60W 2510/182* (2013.01); *B60W 2540/16* (2013.01); *F16H 59/08* (2013.01); *F16H 2312/20* (2013.01)

(58) Field of Classification Search
USPC ......................................................... 701/54
See application file for complete search history.

(56) References Cited

U.S. PATENT DOCUMENTS

| | | | | |
|---|---|---|---|---|
| 4,449,495 A | * | 5/1984 | Fiala | 123/198 DB |
| 5,653,659 A | * | 8/1997 | Kunibe et al. | 477/111 |

(Continued)

FOREIGN PATENT DOCUMENTS

| | | |
|---|---|---|
| DE | 30 25 539 A1 | 1/1982 |
| DE | 102 02 803 B4 | 12/2007 |
| DE | 10 2009 001 376 A1 | 9/2010 |

OTHER PUBLICATIONS

German Search Report dated Jan. 21, 2013 including partial English-language translation (Ten (10) pages).

*Primary Examiner* — Calvin Cheung
(74) *Attorney, Agent, or Firm* — Crowell & Moring LLP

(57) ABSTRACT

In a motor vehicle having at least one drive engine, the vehicle is made ready for travel, at least as concerns the starting of the drive engine and preferably also the establishment of a frictional connection between the drive engine and driven wheels, by way of a combination operating element which is actuated manually by the driver, without relying on a manually actuated operating element provided for at least the first starting of the drive engine upon the operational start of the vehicle. The vehicle is made ready for travel when at least one manually generated command to select a gear is given by the driver via actuation of the combination operating element.

9 Claims, 4 Drawing Sheets

(51) Int. Cl.
*B60W 30/192* (2012.01)
*F16H 59/08* (2006.01)

(56) References Cited

U.S. PATENT DOCUMENTS

| | | | |
|---|---|---|---|
| 5,762,370 A * | 6/1998 | Lindsey et al. | 280/741 |
| 6,202,776 B1 * | 3/2001 | Masberg et al. | 180/65.22 |
| 6,445,084 B1 * | 9/2002 | Daiss et al. | 307/10.2 |
| 6,500,092 B2 * | 12/2002 | Syamoto | 477/99 |
| 6,594,572 B1 * | 7/2003 | Amendt et al. | 701/48 |
| 6,712,736 B2 * | 3/2004 | Scarlata | 477/99 |
| 7,369,936 B2 * | 5/2008 | Flick | 701/113 |
| 7,416,514 B2 * | 8/2008 | Dell et al. | 477/80 |
| 7,496,431 B2 * | 2/2009 | Ehrmaier | 701/1 |
| 7,576,636 B2 * | 8/2009 | Dornbach et al. | 340/426.1 |
| 7,867,133 B2 * | 1/2011 | Petridis et al. | 477/3 |
| 8,075,447 B2 * | 12/2011 | Hori et al. | 477/110 |
| 8,408,175 B2 * | 4/2013 | Schoenek et al. | 123/179.1 |
| 8,600,578 B1 * | 12/2013 | Preston | 701/2 |
| 8,788,183 B2 * | 7/2014 | Chen | 701/112 |
| 2001/0006922 A1 * | 7/2001 | Scarlata | 477/99 |
| 2001/0026212 A1 * | 10/2001 | Strohbeck | 340/5.6 |
| 2006/0052910 A1 * | 3/2006 | Blyden et al. | 701/2 |
| 2013/0211643 A1 * | 8/2013 | Cox et al. | 701/22 |
| 2014/0200742 A1 * | 7/2014 | Mauti, Jr. | 701/2 |

* cited by examiner

METHOD IN A MOTOR VEHICLE HAVING AT LEAST ONE DRIVE ENGINE

CROSS REFERENCE TO RELATED APPLICATION

This application claims priority under 35 U.S.C. §119 from German Patent Application No. DE 10 2012 209 452.0, filed Jun. 5, 2012, the entire disclosure of which is herein expressly incorporated by reference.

BACKGROUND AND SUMMARY OF THE INVENTION

The invention presents a novel intuitive operating concept for preparing a vehicle for travel.

The invention proceeds from conventional motor vehicles which are started for operation by means of an ignition switch which is actuated, by way of example, via an ignition key or an engine start/stop button, wherein particularly a drive engine—most commonly in the form of an internal combustion engine—is first started. Next, to continue to prepare the vehicle for travel, a gear is selected and a clutch is engaged to produce a frictional connection between the drive engine and the driven wheels. This can occur manually by means of gear shifters, or automatically by electronically-controlled automatic transmissions.

The problem addressed by the invention is that of simplifying the preparation of a vehicle for travel.

In the method according to the invention, in a motor vehicle having at least one drive engine, the vehicle is made ready for travel—at least as concerns the starting of the drive engine (for example starting an internal combustion engine and/or starting a high-voltage system of an electric engine), and preferably also as concerns the establishment of the frictional connection between the drive engine and the driven wheels—by way of a combination operating element which is actuated manually by the driver, without relying on a manually actuated operating element (e.g. an ignition key or an engine start/stop switch) which is provided for at least the first starting of the drive engine when the vehicle is started, when at least one manually generated command to select a gear is given by the driver by way of actuation of a combination operating element.

The invention is based on an understanding of the following. Modern vehicles with an increasing number of electrical and electronic convenience equipment are no longer used only in two modes of use—particularly park or drive—as earlier. Rather, vehicle users are increasingly occupying their vehicle as an inhabitable space offering an array of computer-based functions which can be used without the vehicle being made ready for travel. Therefore, the invention particularly proceeds from three modes of use—particularly "park," "inhabit" or "drive."

In this case, the concrete desire to start the drive engine is more of a secondary concern. Rather, a modern vehicle user thinks of functions as park, inhabit or drive. In addition, a sufficient number of sensors are included in current vehicles to effectively detect the desire of the vehicle operator to start the drive function of the vehicle. Therefore, it is sufficient for the vehicle to detect that the driver wants to utilize a drive function at this point. The vehicle then itself initiates the required measures as a result. The function instilled earlier [in drivers] of first starting the drive engine, is made obsolete by the invention. The driver is liberated.

Method steps for automatically stopping and re-starting a drive engine following a first start when the motor vehicle is turned on are further possible according to the invention after the vehicle is made ready for travel—but are subordinate. The invention only relates to the first start of a drive engine, particularly proceeding from an "inhabit" mode.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
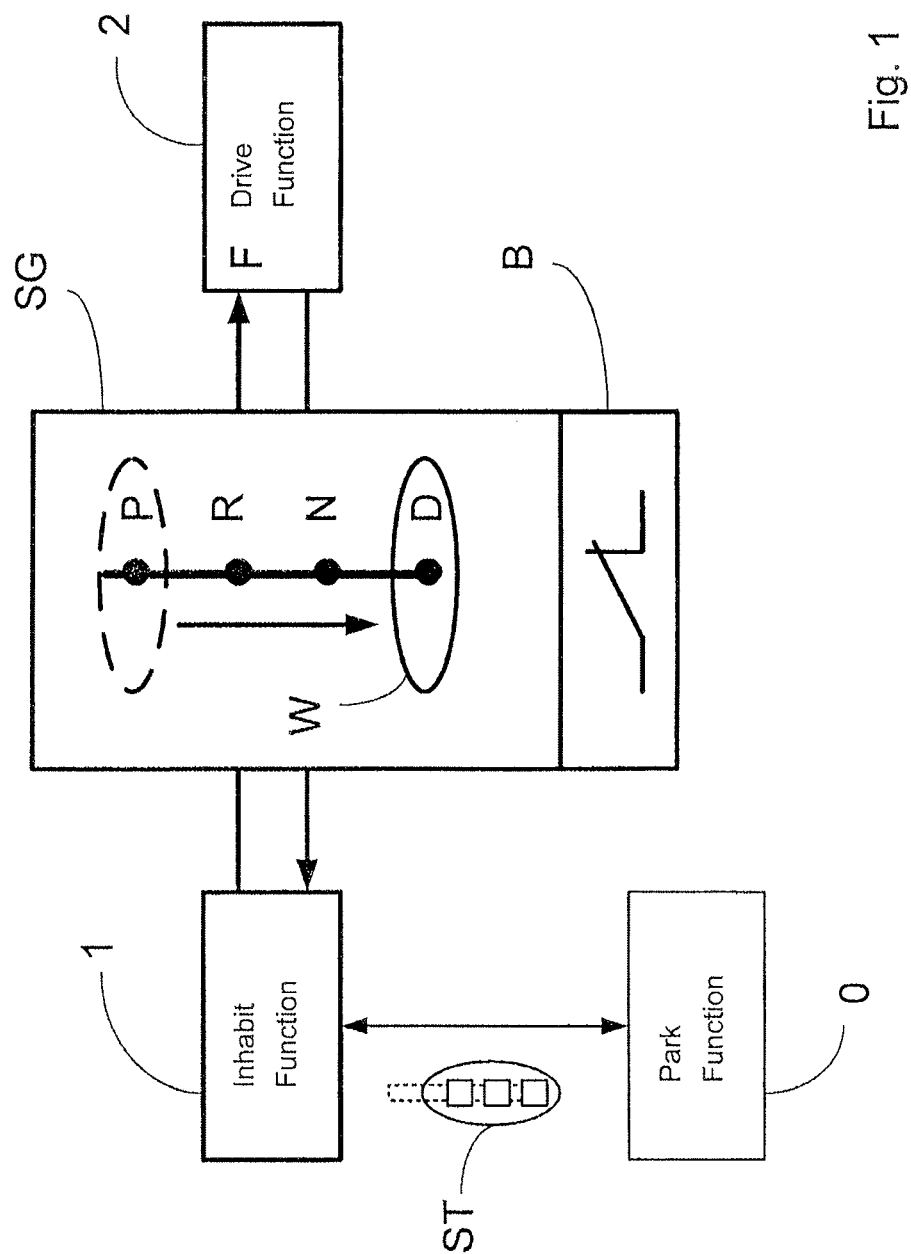
FIG. 1 is a schematic illustration of the vehicle operating modes and the preparation of a vehicle for travel by way of a drive position operating element.
Figure 3:
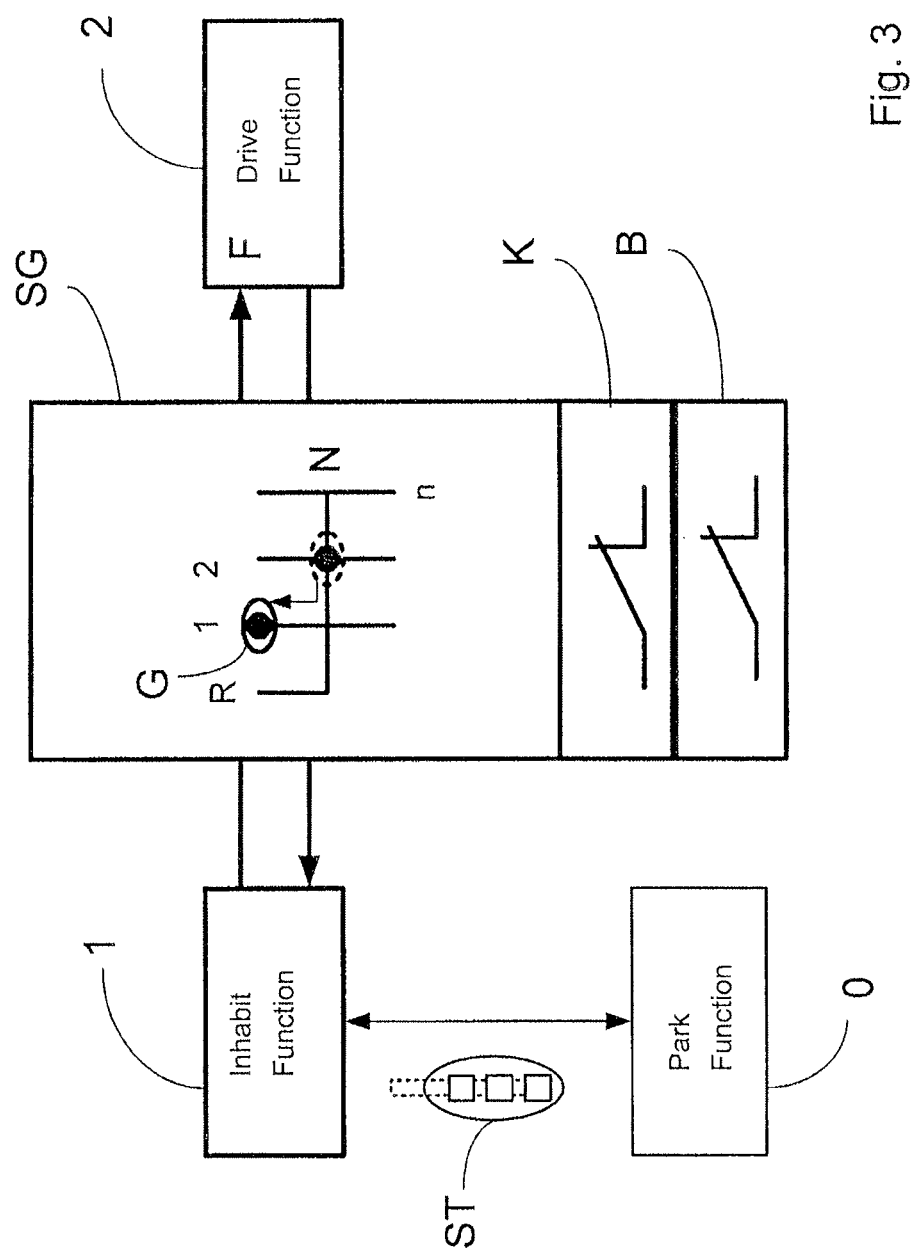
FIG. 3 is a schematic illustration of the vehicle operating modes and the preparation of a vehicle for travel by way of a gear selector operating element.

Three defined operating modes of a motor vehicle are shown schematically as function blocks in FIG. 1 and FIG. 3, namely park 0, inhabit 1, and drive 2. In the park 0 function block, the vehicle is stationary and locked. The driver is positioned outside of the vehicle. If the driver approaches the vehicle with a radio key (or transponder) ST which transmits an identification code, and unlocks the vehicle or opens the doors, the park 0 mode of operation transitions to the inhabit 1 mode of operation.

In the inhabit 1 function block, the driver can use convenience functions such as lighting, auxiliary heating, the navigation system, the hands-free telephone, or functions based on the vehicle computer, for example. In this case, it is not necessary to prepare the vehicle for travel (yet). The invention is implemented upon the transition from the inhabit 1 mode of operation to the drive 2 mode of operation and/or the point of the vehicle being ready for travel F. The driver would like to use his vehicle at this point as a means of transportation. The selection of a gear or a drive position in particular are evidence of this desire of the driver, whereby the desired mode of operation, drive 2, is detected and therefore the readiness for travel F can be automatically activated. A concrete command for the primary start of the drive engine is not required. For this reason, according to the invention, the operating element previously included for this purpose, for manually switching the drive engine on and off (for example the ignition key or the engine start/stop button), is eliminated.

The vehicle is made ready for travel 2, at least in the form of the automatic starting of the drive engine (e.g. start of an internal combustion engine and/or start of the high-voltage system of an electric motor) by way of an electronic control device SG and by way of a combination operating element, which is manually actuated by the driver, indicated in FIG. 1 as the drive position operating element W, and in FIG. 3 as the gear selector operating element G.

According to the embodiment in FIG. 1, the vehicle is made ready for travel F when the drive position operating element W is moved by the driver, for the purpose of selecting a gear, into drive position R (reverse) or D (drive). In the broadest sense, any gear transmission between the drive engine and the driven wheels is understood to be a selection of a gear. As such, a drive position operating element W can be, by way of example, the position selector lever of an automatic transmission with an internal combustion engine as the drive engine, or a drive position shifter of an electric drive. The gears and/or the transmission positions themselves are automatically engaged in this embodiment upon the command to select a gear.

According to the embodiment in FIG. 3, the vehicle is ready for travel F when the gear selector operating element G, particularly the gear lever of a manual transmission, is moved for the purpose of selecting a gear—in this case 1, 2, . . . n or reverse R. In the case of motor vehicles having a manual transmission, multiple alternatives are possible. For example, the vehicle can be made ready for travel F when a gear is selected starting from a neutral position N. Or, if a gear was already selected when the motor vehicle was parked, the vehicle can be made ready for travel F if the gear is unselected and a gear is once more selected. At the same time, where manual transmissions having manual clutches are used, the vehicle is made ready for travel F, preferably in the form of an automatic start of the drive, only once the clutch is pressed in—such that the frictional connection is broken. In cases of manual transmissions which have an automatic clutch, the vehicle can be made ready for travel F—as also in the case of the embodiment in FIG. 1—preferably both in the form of the automatic start of the drive engine and also in the form of the automatic establishment of the frictional connection between the drive engine and the driven wheels.

Figure 2:
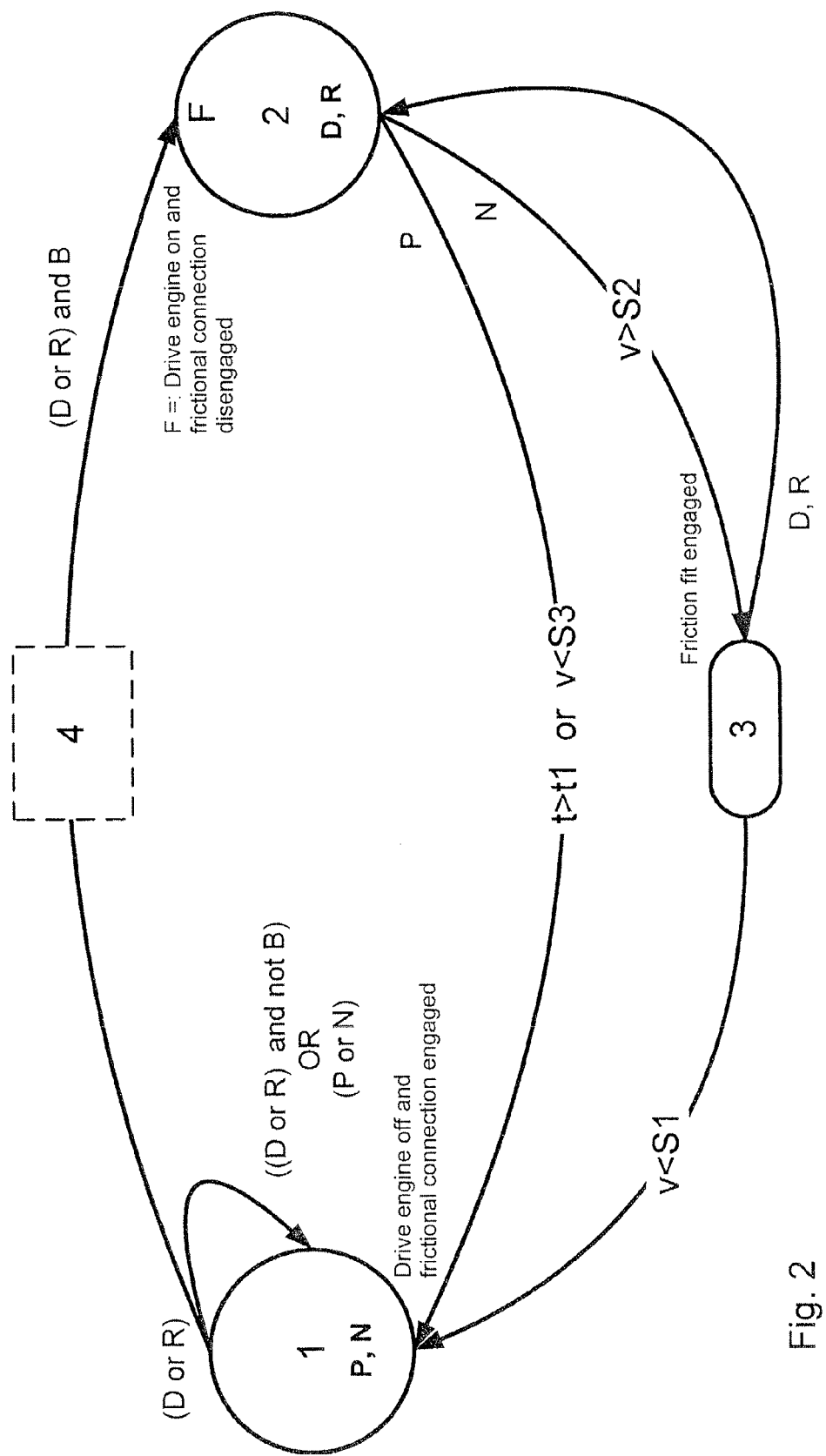
FIG. 2 is a schematic illustration of state transitions in a vehicle having a drive position operating element.
Figure 4:
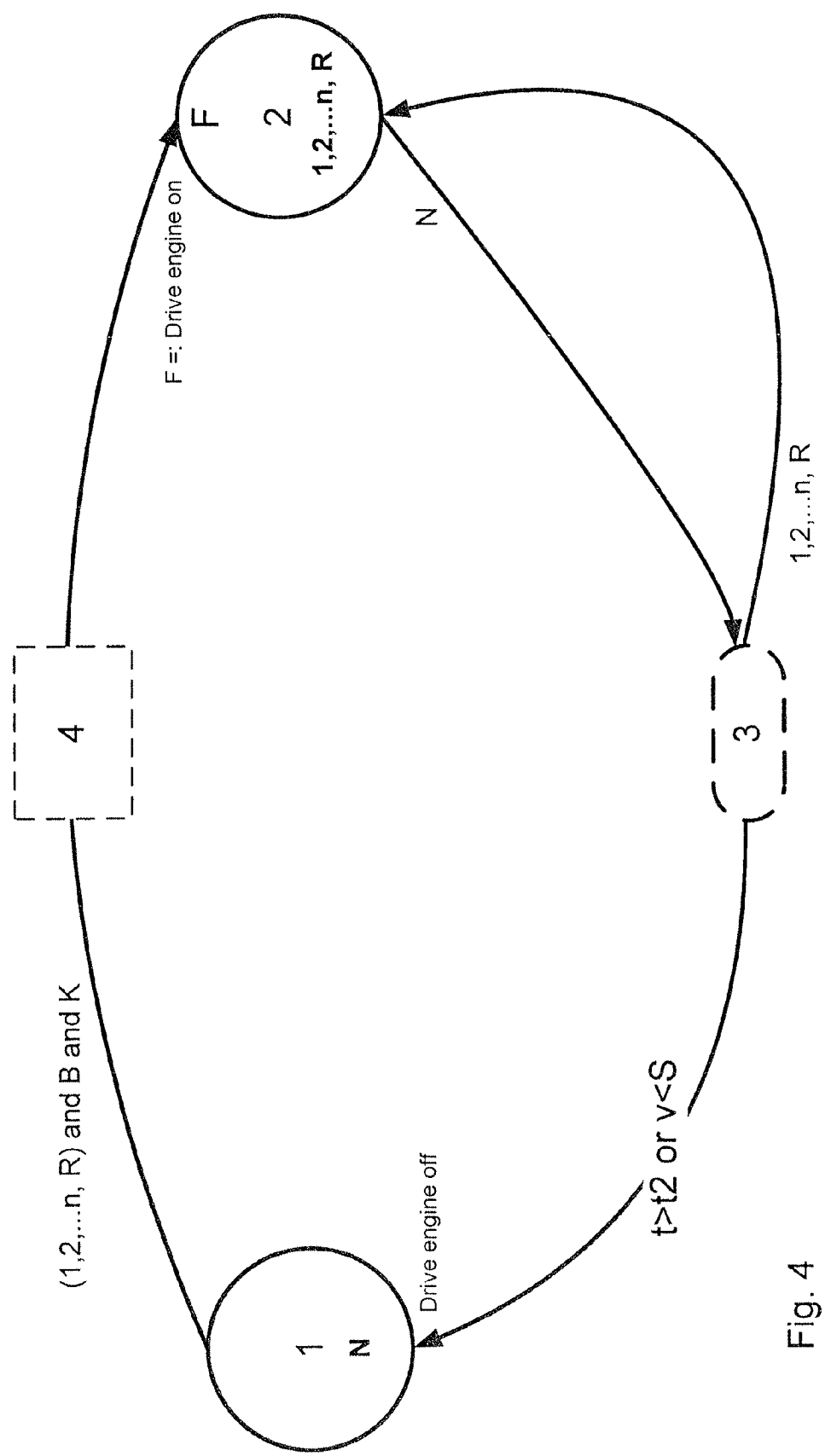
FIG. 4 is a schematic illustration of state transitions in a vehicle having a gear selector operating element.

In FIGS. 2 and 4, the transitions from the inhabit 1 mode of operation into the drive 2 mode of operation and/or the preparation of the vehicle for travel F are each illustrated in the form of a state transition diagram for the embodiments in FIGS. 1 and 3, respectively.

In all embodiments, the readiness for travel F is preferably only established upon the selection of a drive position D, R and/or a gear 1, 2, . . . n, R if a vehicle blocking function B is active during a preparation phase 4 when the vehicle is made ready for travel F; this means when the hydraulic brakes or an electromechanical parking brake, by way of example, are engaged by actuation of the brake pedal or by actuation of a parking brake button in order to prevent uncontrolled movement of the vehicle.

Possible alternatives for ending the state of readiness for travel F are illustrated below with reference to FIGS. 2 and 4.

FIG. 2, which relates to the embodiment according to FIG. 1, is based on the presence of a drive position operating element W and a state of readiness for travel F, wherein both a drive engine is automatically started and the frictional connection is automatically established.

Starting from a state of readiness for travel F, the readiness for travel F is ended (meaning there is a transition for state 1 and/or inhabit 1) upon the selection of the neutral position N of the drive position operating element W by way of the electronic control device SG, if the vehicle speed v is below a first defined threshold S1, particularly if the vehicle is stationary. If the vehicle speed v is above the defined threshold S2 (which can be the same as S1) or a second defined threshold S2, the readiness for travel F preferably first transitions upon the selection of the neutral position N into an intermediate state 3 wherein only the frictional connection is broken—for example if the drive engine is still running—while the drive engine continues to run. Proceeding from the intermediate state 3, the readiness for travel F—which in this case is the re-establishment of the frictional connection—is only enabled again upon the selection of a drive position D, R (that is, without actuation of the brake and/or without activation of a vehicle blocking function B).

Starting from the state of readiness for travel F, the readiness for travel F is only ended upon the selection of the park position P (meaning the drive engine is switched off and the frictional connection engaged) if either the vehicle speed v is below the threshold S3 (which can also be the same as S1 and/or S2 or a third defined threshold S3), and/or the park position P remains selected for longer than a predefined window of time t1 (the emergency off function). In other cases, the park position is ignored as an operating error.

In contrast to FIG. 2, FIG. 4 is based on a motor vehicle having a manual transmission and a manually actuated clutch. In this case, the state of readiness for travel F only consists of the automatic starting of the drive engine. The frictional connection must be manually established by the release of the clutch pedal (the closing of the clutch switch K in FIG. 3). In the case of such manual transmissions, either no park position P is included, or such a park position P would need to be provided for the first time for the functions which are described above in the context of a park position P. In the embodiment according to FIGS. 2 and 4, the assumption is made that no park position P is included. As such, only the functions named above in connection with a neutral position N apply—in this case, that is, when no gear is selected.

In this case, there is a need for a special switch-off condition for the transition from the state of readiness for travel F into the state 1 (in this case, "inhabit") which is carried out by switching off the drive engine. Starting from the state of readiness for travel F, an intermediate state 3 can preferably occur upon a transition from a selected gear into the neutral position N and/or into a coasting mode, wherein the drive engine is switched off but is switched on again if a gear 1, 2, . . . n, R is once again selected (without a blocking function being activated). As such, the intermediate state 3, particularly if the vehicle speed v is greater than a threshold S, transitions once again into the state of readiness for travel F. However, if the motor vehicle comes to a stop and v therefore drops below the threshold S, the drive engine could be started again by means of conventional engine start/stop functions. Therefore, a simple actuation of the clutch pedal could lead to a re-starting of the drive engine, and therefore to a re-establishment of the state of readiness for travel F.

According to the invention, for the purpose of ending the state of readiness for travel F—that is, for the transition to state 1, after which the invention should be implemented again for a new operational start—multiple conditions can be contemplated. According to the invention, in principle conditions must be detected which make it possible to recognize a clear desire of the driver to park the vehicle.

By way of example, the state of readiness for travel F can be ended, and the state 1 re-established, if the vehicle speed v is less than a predefined threshold S—particularly if the vehicle is parked—and the neutral position N is maintained for longer than a predefined time t2. Because a gear is typically selected in manual transmissions for the purpose of parking the vehicle, where there is no park position to prevent the vehicle from rolling away, wherein this gear selection is the command according to the invention for the establishment of readiness for travel F, the definition of a new parking rule is required to prevent an undesired preparation of the vehicle for travel F. For example, the gear could be selected without the actuation of the clutch or the brake; for example only certain gears could be defined for the establishment of readiness for travel F, and other gears for preventing the vehicle from rolling away. Also, the establishment of readiness for travel could be prevented if a defined switch which is not located on the combination operating element is actuated (e.g. a parking lever dedicated for this purpose).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a motor vehicle having at least one drive engine, the method comprising the acts of:
    beginning from an inhabit state of operation of the vehicle, receiving, via an electronic control device of the vehicle, a command to select a gear, wherein the command is generated manually by a driver via actuation of a gear selection operating element; and
    making the motor vehicle in a ready for travel state, via the electronic control device, upon receiving the command to select the gear without relying on an ignition key or an engine start/stop button provided primarily for manually starting and stopping the drive engine,
    wherein the ready for travel state comprises at least an automatic starting of the drive engine via the electronic control device.

2. The method according to claim 1, wherein the ready for travel state comprises a travel readiness state both in a form of the automatic starting of the drive engine and an automatic engagement of a frictional connection between the drive engine and driven wheels of the motor vehicle.

3. The method according to claim 2, wherein the gear selection operating element is a drive position operating element of an automatic transmission or a gear selector operating element of a manual transmission of the motor vehicle; and
    wherein the ready for travel state is established upon selecting a drive position via the drive position operating element or a specified gear via the gear selector operating element.

4. The method according to claim 3, wherein the travel readiness state is only established via the electronic control device upon selecting the drive position or the gear if a vehicle blocking function is active during a preparation phase for the establishment of the travel readiness state.

5. The method according to claim 3, wherein:
    starting from the travel readiness state, ending the travel readiness state via the electronic control device upon selecting a neutral position or a park position of the drive position operating element or the gear selector operating element if at least one of: (i) a vehicle speed is below a defined threshold or (ii) the neutral position or the park position remains selected for longer than a predefined time window.

6. The method according to claim 1, wherein the gear selection operating element is a drive position operating element of an automatic transmission or a gear selector operating element of a manual transmission of the motor vehicle; and
    wherein the ready for travel state is established upon selecting a drive position via the drive position operating element or a specified gear via the gear selector operating element.

7. The method according to claim 6, wherein the travel readiness state is only established via the electronic control device upon selecting the drive position or the gear if a vehicle blocking function is active during a preparation phase for the establishment of the travel readiness state.

8. The method according to claim 6, wherein:
    starting from the travel readiness state, ending the travel readiness state via the electronic control device upon selecting a neutral position or a park position of the drive position operating element or the gear selector operating element if at least one of: (i) a vehicle speed is below a defined threshold or (ii) the neutral position or the park position remains selected for longer than a predefined time window.

9. A motor vehicle, comprising:
    a drive engine;
    a gear selection operating element by which a driver generates manually a command to select a gear of the vehicle; and
    an electronic control unit operatively coupled to receive the command and to make the motor vehicle in a ready for travel state, the ready for travel state comprising at least an automatic starting of the drive engine via the electronic control unit,
    wherein the electronic control unit is operatively configured to automatically start the drive engine, beginning from an inhabit state of the vehicle, upon receiving the command to select the gear by way of the gear selecting operating element,
    wherein the automatic starting of the drive engine does not rely on an ignition key or an engine start/stop button provided primarily for manually starting and stopping the drive engine.

* * * * *